(12) United States Patent
Battey et al.

(10) Patent No.: US 6,483,977 B2
(45) Date of Patent: Nov. 19, 2002

(54) FIBER MANAGEMENT FRAME HAVING MOVABLE WORK PLATFORM

(75) Inventors: Jennifer A. Battey, Euless, TX (US); Steve A. Fontaine, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/834,031

(22) Filed: Apr. 12, 2001

(65) Prior Publication Data

US 2002/0150370 A1 Oct. 17, 2002

(51) Int. Cl.⁷ ................................................ G02B 6/00
(52) U.S. Cl. ........................................................ 385/135
(58) Field of Search ................................... 385/135, 147

(56) References Cited

U.S. PATENT DOCUMENTS

| | | | | |
|---|---|---|---|---|
| 4,266,853 A | * | 5/1981 | Hutchins et al. | 211/47 |
| 4,679,896 A | * | 7/1987 | Krafcik et al. | 385/135 |
| 5,323,480 A | * | 6/1994 | Mullaney et al. | 385/134 |
| 5,544,273 A | * | 8/1996 | Harrison | 385/134 |
| 5,778,131 A | * | 7/1998 | Llewellyn et al. | 385/135 |
| 6,009,224 A | * | 12/1999 | Allen | 385/135 |
| 6,249,632 B1 | * | 6/2001 | Wittmeier et al. | 385/135 |
| 6,275,640 B1 | * | 8/2001 | Hunsinger et al. | 385/135 |

* cited by examiner

Primary Examiner—Tulsidas Patel
(74) Attorney, Agent, or Firm—Christopher C. Dremann (57) ABSTRACT

A fiber management frame having a movable work platform and an interconnection closure including the fiber management frame are provided for supporting and securely retaining various sized optical fiber connection trays and test equipment adjacent the fiber management frame, while also permitting a technician to readily support and retain any one of the trays without damaging the optical connections housed by the trays. The work platform includes a generally planar shelf and a bias member positioned on the shelf opposite a pair of upwardly and inwardly extending first outer flanges. The bias member biases the tray in the direction of the first outer flanges so as to securely retain the tray between the bias member and the first outer flanges. Preferably, the work platform is hingedly mounted to the fiber management frame such that the work platform can be rotated between an operational position and a stowed position.

28 Claims, 5 Drawing Sheets

FIBER MANAGEMENT FRAME HAVING MOVABLE WORK PLATFORM

FIELD OF THE INVENTION

The present invention relates generally to interconnection closures and, more particularly, to interconnection closures including a fiber management frame having a movable work platform for supporting and securely retaining various sized optical fiber connection trays and test equipment adjacent the fiber management frame.

BACKGROUND OF THE INVENTION

Fiber optic networks typically include interconnection closures at splice locations throughout the fiber optic network. Typically, these interconnection closures include splice closures, patch closures and the like. For example, splice closures commonly house the splices required to connect the optical fibers of one or more fiber optic feeder cables to respective ones of the optical fibers of one or more fiber optic drop cables. By housing the splices, a splice closure protects the spliced end portions of the optical fibers from strain, environmental degradation, and other deleterious forces, thereby increasing the reliability and quality of the splices.

While fiber optic networks have traditionally served as the backbone or trunkline of communication networks to transmit signals over relatively long distances, fiber optic networks are gradually being extended closer to the end points of the communications networks. In this regard, fiber optic networks have been developed that deliver fiber-to-the-curb, fiber-to-the-home, fiber-to-the-business, fiber-to-the-desk, and the like. In each of these different applications, a splice closure must be capable of splicing different types of cables to establish the proper interconnections. In this regard, the splice closure utilized in a fiber-to-the-home, fiber-to-the-business, or fiber-to-the-desk application is mounted upon a fiber optic feeder cable and one or more fiber optic drop cables to permit at least some of the optical fibers of the feeder cable to extend uninterrupted through the splice closure while splicing or otherwise connecting the other optical fibers of the fiber optic feeder cable with optical fibers of the drop cable(s). In contrast, a splice closure that is utilized in a fiber-to-the-curb application is mounted upon not just a fiber optic feeder cable and one or more drop cables, but also an electrical feeder cable. In this application, the splice closure must facilitate the splicing of one or more electrical conductors of the electrical feeder cable to corresponding electrical conductors of the drop cable(s), while permitting the remainder of the electrical conductors to extend uninterrupted through the closure. Additionally, the splice closure must facilitate the splicing of one or more of the optical fibers of the fiber optic feeder cable with respective optical fibers of the drop cable(s) while continuing to permit at least some of the optical fibers of the fiber optic feeder cable to extend uninterrupted through the closure.

In either type of splice closure, the closure must provide a mechanism for connecting optical fibers, such as splicing one or more optical fibers of a fiber optic feeder cable with respective optical fibers of a drop cable, and for testing the continuity of the optical fiber connections, both during initial configuration and subsequent reconfiguration of the splice closure. Typically, the splice closure includes one or more splice trays, coupler trays and/or connector panels that facilitate the splicing or other connection of respective pairs of the optical fibers. For ease of reference, splice trays, coupler trays, and connector panels will be hereinafter collectively referred to as "optical fiber connection trays" or simply "trays." Each such tray is designed to house a plurality of connections between respective pairs of optical fibers. Since many splice closures include a large number of connections between respective pairs of optical fibers, splice closures oftentimes include a plurality of trays, typically stacked one upon another and/or stored in separate compartments within the splice closure.

The trays are preferably secured within the splice closure such that they are fixed in position once the closure has been configured and is placed into service. As such, the trays should not shift or otherwise move once the splice closure has been placed into service since any shifting or other movement of the trays could harm the connections between respective pairs of optical fibers. Some splice closures include a strap, such as a hook and loop strap, that wraps about the trays to secure the trays in position. Alternatively, the trays may define an aperture and the splice closure may include a post upon which the trays are mounted such that the post extends through the corresponding apertures defined by the trays, thereby securing the trays in position. Other means for securing the trays within the closure are described in the co-pending U.S. Patent Application entitled Fiber Management Frame For Securely Retaining Optical Fiber Connection Trays filed by Jennifer Battey, et al. and assigned to the assignee of the present application, the disclosure of which is hereby incorporated by reference in its entirety.

While the trays are desirably fixed in position once the splice closure has been configured and placed in service, the closure is also preferably designed such that the trays can be readily accessed by a technician both during the initial configuration of the closure in which connections are established between respective pairs of the optical fibers and during any subsequent reconfiguration of the closure in which at least some of the connections between respective pairs of the optical fibers are changed. For splice closures that include a strap for retaining stacked trays, the strap must be released and the appropriate tray removed from the stack. For splice closures that include a plurality of stacked trays mounted upon an upstanding post, the appropriate tray must be removed from the post and the stack. In either instance, the tray must then be supported and securely retained in a convenient work location where it can be opened to provide the technician with access to the optical fiber connections housed by the tray.

Reconfiguring an aerial splice closure is especially difficult, particularly in applications, such as previously discussed, when at least some of the optical fibers of the optical fiber feeder cable and/or at least some of the electrical conductors of the electrical feeder cable extend uninterrupted through the closure. In such applications, sometimes referred to as "taut sheath" applications, the splice closure cannot be removed from the fiber optic feeder cable, the electrical feeder cable, and the drop cables. Accordingly, the aerial splice closure must be reconfigured from a ladder or an aerial bucket of a utility truck that is positioned in close proximity to the closure. It is known to provide a work platform on the ladder or the aerial bucket. However, the work platform provided on the ladder or aerial bucket cannot always be positioned sufficiently close to the fiber management frame of the splice closure, for example when the cover of the closure interferes with the ladder or aerial bucket in its open position. Furthermore, work platforms provided on ladders and aerial buckets typically are not adapted for securely retaining the various sized trays housed within different splice closures or the various sized test equipment utilized, for example, to verify the continuity of the optical connections.

Not only does positioning various sized trays and test equipment on the work platform of a ladder or aerial bucket create additional work for the technician reconfiguring the splice closure, but the additional movement of the trays increases the risk that the optical fiber connections housed by the trays will be damaged during the reconfiguration. As such, it would be desirable to provide a splice closure with a movable work platform for supporting any one of the trays without having to remove the tray from the closure and to support the tray on a work platform provided on a ladder or an aerial bucket. More particularly, it would be desirable to develop a splice closure including a fiber management frame having a movable work platform for supporting and securely retaining various sized trays and test equipment adjacent the fiber management frame during initial configuration and reconfiguration of the closure. Furthermore, it would be desirable to develop a splice closure having a movable work platform that permits a technician to more readily support and retain any one of the optical fiber connection trays without damaging the optical connections housed by the tray.

SUMMARY OF THE INVENTION

A fiber management frame having a movable work platform and an interconnection closure including the fiber management frame are provided for supporting and securely retaining various sized optical fiber connection trays and test equipment adjacent the fiber management frame during initial configuration and reconfiguration, while also permitting a technician to readily support and retain any one of the trays without damaging the optical connections housed by the tray.

According to one aspect of the present invention, an interconnection closure includes a fiber management frame and a work platform movably attached to the fiber management frame. The work platform includes means for supporting and securely retaining various sized optical fiber connection trays selected from the consisting of a splice tray, a coupler tray, and a connector panel. The means for supporting and securely retaining includes a shelf having an inner edge adjacent the fiber management frame and an outer edge opposite the inner edge, a bias member positioned on the shelf, and at least one first outer flange extending upwardly from the shelf and positioned opposite the bias member. The bias member engages a lengthwise edge of the trays and biases the tray in the direction of the first outer flange to securely retain the tray between the bias member and the first outer flange. The means for supporting and securely retaining further includes at least one first inner flange extending upwardly from the shelf adjacent the inner edge of the shelf. The first inner flange has an aperture therethrough for receiving a fastener for affixing the work platform to the fiber management frame. The means for supporting and securely retaining further includes at least one second inner flange extending upwardly from the shelf and the bias member is affixed to the second inner flange.

In another aspect of the present invention, the work platform is hingedly mounted to the fiber management frame and the means for supporting and securely retaining includes a hinge. The hinge has a first half affixed to the fiber management frame and a second half affixed to the work platform. More particularly, the second half of the hinge is affixed to the underside of the inner edge of the shelf adjacent the fiber management frame. As previously described, the means for supporting and securely retaining further includes a first inner flange extending upwardly from the shelf adjacent the inner edge. The first inner flange has an aperture therethrough for receiving a fastener for affixing the work platform to the fiber management frame in an operational position. The means for supporting and securely retaining further includes a second outer flange extending outwardly from the shelf. The second outer flange has an aperture therethrough for receiving a fastener for affixing the work platform to the fiber management frame in a stowed position.

In another aspect of the present invention, a fiber management frame having a movable work platform adjacent the fiber management frame is provided for supporting and securely retaining various sized optical fiber connection trays. The work platform includes a shelf having an inner edge adjacent the fiber management frame and an outer edge opposite the inner edge. The work platform further includes a bias member positioned on the shelf and a first outer flange extending upwardly from the shelf and opposite the bias member. The bias member engages a lengthwise edge of the trays and bias the tray in the direction of the first outer flange. The work platform further includes at least one first inner flange extending upwardly from the shelf adjacent the inner edge of the shelf. The first inner flange has an aperture therethrough for receiving a fastener for affixing the work platform to the fiber management frame. The work platform further includes at least one second inner flange extending upwardly from the shelf and the bias member is affixed to the second inner flange.

In another aspect of the present invention, the bias member of the work platform is a thin, elongate strip of elastic material having a first end affixed to the second inner flange, a second end opposite the first end and positioned adjacent and parallel to the second inner flange, and an outermost portion opposite the first outer flange. The outermost portion engages a lengthwise edge of the trays and biases the tray in the direction of the first outer flange. The bias member thereby exerts pressure on the lengthwise edge of the trays to securely retain the tray between the outermost portion of the bias member and the first outer flange. In a preferred embodiment, the bias member is formed of spring steel, the first end of the bias member is affixed to the second inner flange, and the second end of the bias member is free to slide parallel to the second inner flange beneath a guide flange. As previously described, the first inner flange extends upwardly from the shelf adjacent the inner edge of the shelf and has an aperture therethrough for receiving a fastener for affixing the work platform to the fiber management frame in an operational position. The second outer flange extends outwardly from the shelf and has an aperture therethrough for receiving a fastener for affixing the work platform to the fiber management frame in a stowed position. The work platform may further include a hinge having a first half affixed to the fiber management frame and a second half affixed to the shelf such that the shelf rotates about the hinge between the operational position and the stowed position.

In yet another aspect of the present invention, a method is provided for supporting and securely retaining various sized optical fiber connection trays on a movable work platform adjacent a fiber management frame housed within an interconnection closure. The work platform includes a shelf, a bias member positioned on the shelf, and a first outer flange extending upwardly from the shelf and positioned opposite the bias member. The method includes the first step of positioning the work platform in an operational position adjacent the fiber management frame. The method further includes the second step of removing one of the trays from the fiber management frame. The method further includes the third step of positioning the tray on the work platform between the bias member and the first outer flange such that the bias member biases the tray in the direction of the first outer flange. Preferably, the work platform further includes a first inner flange extending upwardly from the shelf adjacent the inner edge that has an aperture therethrough for receiving a fastener for affixing the work platform to the fiber management frame in an operational position, and a second outer flange extending outwardly from the shelf that has an aperture therethrough for receiving a fastener for affixing the work platform to the fiber management frame in a stowed position. As previously mentioned, the work platform is hingedly mounted to the fiber management frame and the work platform includes a hinge such that the shelf rotates about the hinge between the operational position and the stowed position.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention will be described more fully hereinafter with reference to the accompanying drawings, in which preferred embodiments of the invention are shown. The invention may, however, be embodied in many different forms and should not be construed as limited to the embodiments set forth herein; rather, the preferred embodiments are provided so that this disclosure will be thorough and complete, and will fully convey the scope of the invention to those skilled in the art. Like numbers refer to like elements throughout.

Figure 1:
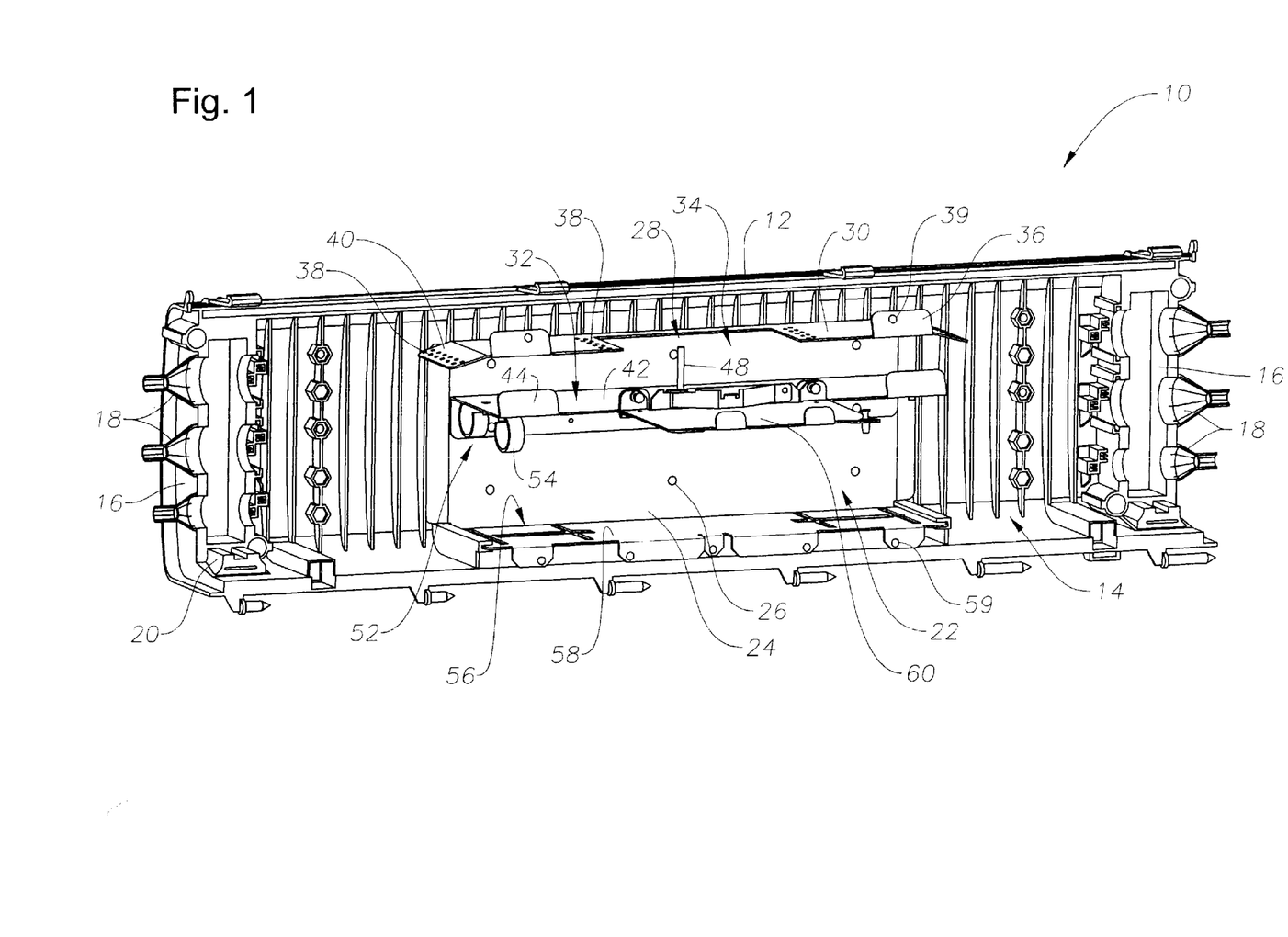
FIG. 1 is a perspective view of an interconnection closure including a fiber management frame having a movable work platform according to one embodiment of the present invention in which a portion of the housing of the interconnection closure and the optical fiber connections trays have been removed to show the interior cavity defined by the interconnection closure and the fiber management frame disposed therein.

Referring now to FIG. 1, an optical fiber interconnection closure 10 according to one advantageous embodiment of the present invention is illustrated. The closure may be a splice closure, a patch closure or the like. Moreover, the closure may be installed in an aerial location, buried, disposed in an enclosure, or otherwise sealed. For purposes of example and not of limitation, however, the interconnection closure will be hereinafter described as an aerial splice closure. Although the splice closure of the illustrated embodiment is an in-line closure, the closure of the present invention may have other configurations, such as a canister or "butt" type closure, without departing from the spirit and the scope of the present invention.

As illustrated, the closure 10 includes a housing 12 defining an internal cavity 14. While the housing may have a variety of shapes, the housing of the illustrated embodiment is generally tubular with a substantially rectangular shape in lateral cross-section. The housing extends lengthwise between a pair of opposed, open ends. The closure also generally includes a pair of end caps 16 disposed within respective ones of the open ends of the housing and secured to the housing, such as by means of an annular collar or other fastener in a manner known to those skilled in the art. While the housing and the end cap may be formed of a variety of materials, the housing and the end caps of one advantageous embodiment are molded of a rigid plastic material.

As known to those skilled in the art and as shown in FIG. 1, the end caps 16 of the splice closure 10 generally define a plurality of ports for receiving respective cables. The ports defined by the end caps may receive a fiber optic feeder cable that extends through the closure and the end portions of one or more fiber optic drop cables. While the end caps may define a number of different types of ports, the end caps of the illustrated embodiment include conical-shaped ports 18 for receiving and securely engaging a fiber optic feeder cable and/or an electrical feeder cable, and a seam 20 defined by a plurality of opposed, flexible fingers through which one or more drop cables extend. As such, in fiber-to-the-home, fiber-to-the-business, or fiber-to-the-desk applications, one or more of the optical fibers of a fiber optic feeder cable are spliced to respective optical fibers of the fiber optic drop cables within the closure, while the remaining optical fibers of the fiber optic feeder cable extend uninterrupted through the closure. Additionally, in fiber-to-the-curb applications, the end caps define ports for receiving an electrical feeder cable. Thus, one or more of the electrical conductors of the electrical feeder cable are also spliced to corresponding electrical conductors of the drop cables, while the remaining electrical conductors of the electrical feeder cable extend uninterrupted through the closure. Accordingly, the drop cables in a fiber-to-the-curb application are typically composite cables that include both electrical conductors and optical fibers. As will be apparent to those skilled in the art, however, the closure and, more particularly, the end caps may be configured to receive and interconnect other combinations of fiber optic and/or electrical cables, if so desired.

In addition to receiving a variety of different types of cables, the splice closure 10 may receive, route, and interconnect different types of optical fibers, such as loose buffered optical fibers and ribbon fiber. As such, the term "optical fiber" as used herein is intended to include all types of optical fibers, including loose buffered optical fibers, optical fibers in the form of a multifiber ribbon, individual optical fibers, or any other subunit of a fiber optic cable. Additionally, the optical fiber may have various diameters, including diameters of 900 micron, 2 mm and 3 mm.

The splice closure 10 of the present invention also includes a fiber management frame 22 disposed within the internal cavity 14, as depicted in FIG. 1. The fiber management frame of the illustrated embodiment includes a back panel 24 that is attached to the housing 12, such as by means of a plurality of bolts or other fasteners that extend through corresponding apertures 26 defined by the back panel and engage the housing. As depicted, the fiber management frame is mounted within a medial portion of the housing. However, the fiber management frame may, instead, be mounted closer to either end of the housing, if so desired. Additionally, while the fiber management frame is depicted to extend lengthwise for about one-half of the length of the housing, the fiber management frame may be either larger or smaller depending upon the size of the housing and the requirements of the particular fiber optic network application. Typically, the fiber management frame is formed of a metal, such as aluminum, although the fiber management frame may be made of other rigid materials, including molded plastic, if so desired.

The fiber management frame 22 includes a support, or partition 58 for holding one or more optical fiber connection trays, such as splice trays, coupler trays, and/or connector panels (hereinafter generically and collectively referred to as "optical fiber connection trays" or simply "trays"). Although not necessary for the practice of the present invention, the fiber management frame of the illustrated embodiment includes a number of partitions, one of which serves as partition 58. As such, the fiber management frame of the present invention will be described in conjunction with the embodiment having three separate partitions, even though the fiber management frame may have a number of other configurations and any number of partitions, if so desired. In the illustrated embodiment, however, the partitions define a plurality of compartments, and in particular four compartments, each of which extends in a lengthwise direction so as to be in-line relative to the optical fibers and, in some instances, such as fiber-to-the-curb applications, the electrical conductors that extend through the closure 10.

In the illustrated embodiment, the fiber management frame 22 includes first, second, third and fourth compartments that extend side-by-side in a parallel fashion. The first compartment 28 includes a partition 30 that extends both outwardly from the back panel 24 and lengthwise through the splice closure 10. The partition 30 separates the first compartment 28 from the second compartment 32. However, the partition defines an opening or a cutout 34 to facilitate access to the second compartment as described below. The first compartment extends lengthwise from a first open end to a second open end. Thus, optical fibers or electrical conductors may extend lengthwise through the first compartment as previously described in fiber-to-the-home, fiber-to-the-business, fiber-to-the-desk, and fiber-to-the-curb applications.

To retain the optical fibers and the electrical conductors, the first compartment 28 may also include at least one and, more typically, a plurality of upturned flanges 36 spaced lengthwise along the outer edge of the partition 30 opposite the back panel 24. Additionally, the first compartment may include a removable cover (not shown) for protecting the optical fibers and electrical conductors extending through the first compartment. The cover may, for example, be attached by means of a bolt or other type of fastener to the upturned flanges and, in particular, to holes 39 defined by the upturned flanges. Thus, the cover can be removed while the splice closure 10 is being configured or reconfigured to provide access to the first compartment. Conversely, the cover may be installed following the configuration or reconfiguration of the splice closure to protect the optical fibers and electrical conductors. Additionally, the partition 30 may define a plurality of holes 38 for receiving tie wraps or other types of fasteners. As such, the tie wraps or other types of fasteners may be wrapped about the optical fibers and electrical conductors and may extend through at least a pair of the holes defined by the partition to secure and strain relieve the optical fibers and electrical conductors to the partition. As depicted, the partition may define holes at various locations, including at locations proximate the opposed open ends of the first compartment 28.

In the embodiment depicted in FIG. 1, the first compartment 28 also includes an angled ramp 40 projecting outwardly from at least one end and, more typically, both ends, of the partition 30. As depicted, the angled ramp generally slopes slightly downwardly towards the second compartment 32 so as to assist in guiding the optical fibers and the electrical conductors from a respective port into the first compartment. As also shown, the angled ramp may define a plurality of the holes 38 through which the wraps or other types of fasteners may extend to secure and strain relieve the optical fibers and the electrical conductors to the ramp of the partition.

The second compartment 32 of the illustrated embodiment likewise includes a partition 42 extending both outwardly from the back panel 24 and in a lengthwise direction. As depicted, the partition of the second compartment is spaced somewhat from the partition 30 of the first compartment 28 to define the second compartment therebetween. The second compartment also extends in a lengthwise direction from a first end to a second end. Typically, each end is open for receiving optical fibers. However, in fiber-to-the-home, fiber-to-the-business, or fiber-to-the-desk applications, optical fibers typically only pass through the first end of the second compartment such that only the first end need be open. To permit the fiber management frame 22 to be used universally in both fiber-to-the-home and fiber-to-the-curb applications, however, the fiber management frame is preferably designed such that both the first and second ends of the second compartment are open for receiving optical fibers.

Like the first compartment 28, the second compartment 32 also preferably includes at least one and, more typically, a plurality of upturned flanges 44 spaced lengthwise along the outer edge of the partition 42 opposite the back panel 24 for retaining the optical fibers within the second compartment. Moreover, the partition of the second compartment may define a plurality of holes (not shown) similar to holes 38 of partition 30 for receiving tie wraps or other types of fasteners to secure and strain relieve the optical fibers to the partition of the second compartment, as described above in connection with the first compartment. The second compartment may also include an engagement member 48, such as an upstanding peg, for engaging at least one optical fiber connection tray, such as a splice tray 80, 82, (FIGS. 4 and 5) supported on the partition of the second compartment.

The third compartment 52 of the illustrated embodiment is proximate the second compartment 32 and likewise extends in a lengthwise direction from a first open end to a second open end. Thus, the third compartment may receive optical fibers, such as the optical fibers of a drop cable, through both the first and second ends. The third compartment is primarily designed to store slack lengths of optical fibers, including the optical fibers of the drop cables and the optical fibers of the fiber optic feeder cable. The third compartment may include a plurality of retaining clips 54. The plurality of clips are preferably connected to the underside of the partition 42 of the second compartment. Typically, the clips are arranged in one or more lengthwise extending rows. For example, the clips may be disposed in two lengthwise extending rows, as shown in FIG. 1. In addition, the clips are preferably spaced apart in a lengthwise direction to adequately support the optical fiber. Preferably, the clips are open rings that permit optical fibers to be inserted into and removed from the rings, although the clips may have other configurations if so desired. The third compartment may instead be formed in other manners, such as by means of another partition extending both outwardly from the back panel 24 and in a lengthwise direction. In this alternative embodiment, the partition of the third compartment is spaced from the partition of the second compartment so as to define a region between the partitions of the second and third compartments through which the optical fibers may extend.

The fourth compartment 56 of the fiber management frame 22 is proximate the third compartment 52 in the illustrated embodiment. The fourth compartment includes the partition 58 that likewise extends outwardly from the back panel 24 and in a lengthwise direction between a first open end and a second open end. Since the optical fibers typically only enter and exit the fourth compartment from one end, however, the other end of the compartment could be closed, if so desired. In both fiber-to-the-home and fiber-to-the-curb applications, the fourth compartment is advantageously designed to store at least one optical fiber connection tray, such as a splice tray 80, 82 (FIGS. 4 and 5), in the same manner as the second compartment 28, so that the optical fibers of a fiber optic feeder cable may be interconnected with corresponding optical fibers of a drop cable. As such, the partition 58 serves as an immovable support for holding one or more optical fiber connection trays. By being capable of storing various sized optical fiber connection trays, the fiber management frame of the present invention provides a common frame for supporting different trays and routing optical fiber and electrical conductors to thereby reduce the number of different types of closures that must be manufactured and installed.

While a fiber management frame 22 of one advantageous embodiment has been illustrated and described, the fiber management frame may have other configurations, if so desired. For example, the various compartments may have different heights and widths. Additionally, the compartments may be oriented differently with the fourth compartment 56 being the topmost compartment and the first compartment 28 being the lowermost compartment. However, the fiber management frame preferably defines the compartments to be in-line with the feeder and drop cables to facilitate the routing of the optical fibers and, in fiber-to-the-curb applications, electrical conductors. Furthermore, the fiber management frame 22 of the present invention may include various means for engaging the optical fiber connection trays and for preventing undesired movement of the trays once the splice closure 10 has been configured. Various means for engaging and securely retaining the trays within the closure are depicted and described in the co-pending U.S. Patent Application entitled Fiber Management Frame For Securely Retaining Optical Fiber Connection Trays filed by Jennifer Battey, et al. and assigned to the assignee of the present application, the disclosure of which is hereby incorporated by reference in its entirety. The trays may be engaged and securely retained as described in the above referenced application, or may be engaged and securely retained in any other known manner, unless and until it is necessary to access the optical connections housed by the trays, such as to reconfigure the initial optical connections. Whenever it becomes necessary to access the optical connections, the appropriate tray must be removed, for example, from the partition 42 of the second compartment 32 or from the partition 58 of the fourth compartment 56, and positioned on a work platform located in close proximity to the fiber management frame 22.

Figure 2:
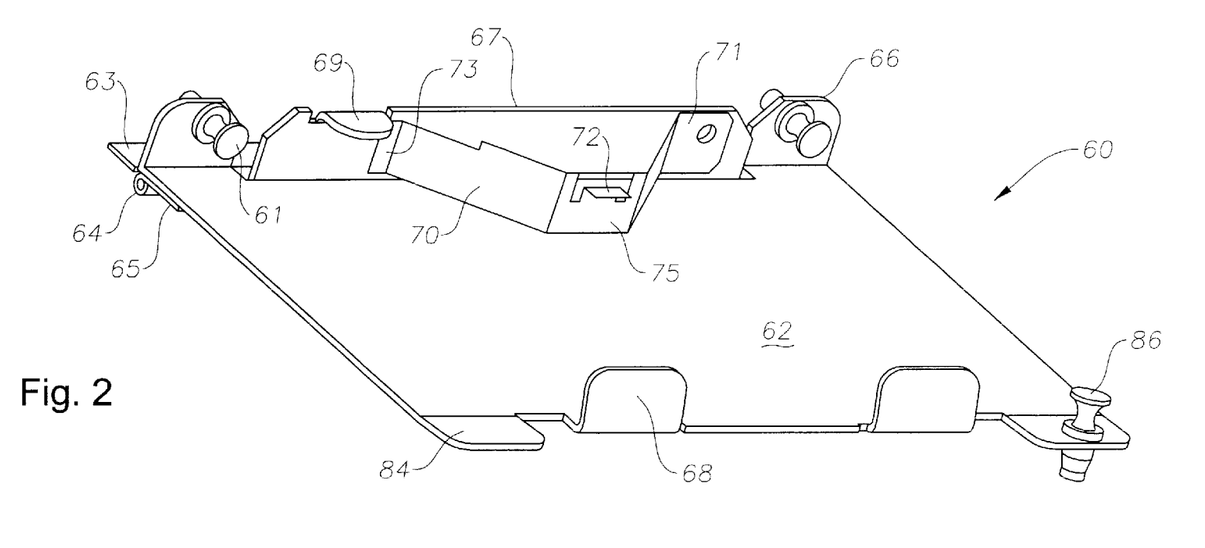
FIG. 2 is a perspective view of the movable work platform of the fiber management frame of FIG. 1.
Figure 3:
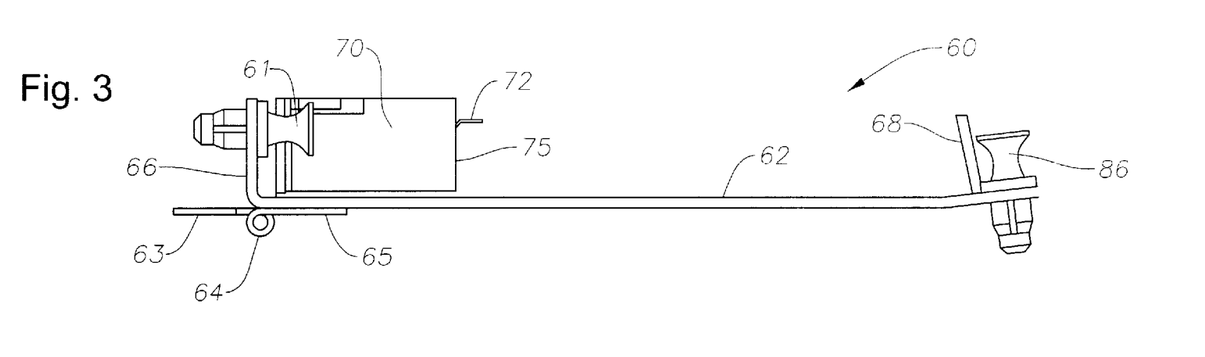
FIG. 3 is an end view of the movable work platform of FIG. 2.

As shown in FIGS. 2 and 3, the fiber management frame 22 includes a movable work platform 60 adjacent the fiber management frame. As depicted in the embodiment of the splice closure 10 illustrated in FIGS. 1 and 6, the work platform is movably mounted to the partition 42 of the second compartment 32. Because the work platform is advantageously mounted to the partition of the second compartment, in taut sheath applications, such as previously described, the taut sheath splice trays and/or coupler trays from the second compartment as well as drop fiber splice trays from the fourth compartment can be easily supported and securely retained on the work platform during splicing operations. The work platform may, however, be movably mounted to any other portion of the fiber management frame, such as to partition 30 of the first compartment 28 or to partition 58 of the fourth compartment or to the back panel 24. Furthermore, a removable work platform may be alternately mounted to any of the partitions or the back panel, or multiple work platforms may be mounted to any two or more of the partitions and the back panel.

Preferably, as depicted herein, the work platform 60 is hingedly mounted to the fiber management frame 22 for a purpose to be described hereinafter. However, the work platform may be removably mounted to the fiber management frame and stowed when not in use at a convenient location on the fiber management frame or elsewhere within the cavity 14 defined by the splice closure 10. Accordingly, the work platform preferably includes conventional snap fasteners 61 for releasably mounting the work platform on the fiber management frame or the housing 12 of the closure. In the embodiment depicted herein, the work platform includes a conventional hinge 64 having a first half 63 secured by conventional fasteners, such as screws or bolts, to the underside of partition 42 of the second compartment 32. The hinge has a second half 65 that is likewise secured by conventional fasteners to a generally planar shelf 62 for supporting one of the optical fiber connection trays, such as splice trays 80, 82 (FIGS. 4 and 5) stored within the housing of the closure. When the shelf is not being utilized to support an optical fiber connection tray, the shelf may be utilized to support other items adjacent the fiber management frame of the closure, such as test equipment, for example, to verify the continuity of the optical connections housed by the trays.

The shelf 62 of the work platform 60 has a plurality, and preferably, as depicted herein, at least a pair, of first inner flanges 66 extending upwardly adjacent the inner edge of the shelf opposite the hinge 64. Apertures are formed in the flanges 66 for receiving the snap fasteners 61 that secure the work platform to the partition 42 of the second compartment 32 in the operational position (FIG. 1). The snap fasteners engage apertures formed in at least two of the upturned flanges 44 formed on the partition 42 to retain the work platform in the operational position. The shelf of the work platform further has a second inner flange 67 extending upwardly adjacent and slightly inwardly from the inner edge of the shelf. The second inner flange is positioned medially between the first inner flanges, for a purpose to be described. As shown, the second inner flange consists of a single elongate flange spanning substantially the entire lengthwise distance between the first inner flanges. The second inner flange, however, may consist of two or more separate flanges positioned at suitable locations between the first inner flanges. The shelf of the work platform further has at least one, and preferably at least two, first outer flanges 68 extending upwardly adjacent the outer edge of the shelf opposite the first inner flanges and the second inner flange.

The work platform 60 further includes means for securely retaining one of the optical fiber connection trays, such as splice tray 80, 82 (FIGS. 4 and 5), between the second inner flange 67 and the first outer flanges 68. The work platform may also be utilized to securely retain other items adjacent the fiber management frame, such as previously mentioned, to securely retain a piece of test equipment, for example, to verify the continuity of the optical connections housed by the trays. In one advantageous embodiment depicted herein, the means for securely retaining the trays includes a bias member 70 affixed to the second inner flange so as to bias the tray or other item in the direction of the first outer flanges. The bias member, however, may also be affixed to at least one of the first outer flanges so as to bias the tray or other item in the direction of the second inner flange. Furthermore, the bias member could be affixed to at least one of the first inner flanges 66 so as to bias the tray or other item in the direction of the first outer flanges. Preferably, the bias member is a thin strip of elastic metal, such as spring steel, affixed at a first end 71 to the second inner flange so as to exert pressure on a lengthwise edge of the tray against the first outer flanges. The second end 73 of the bias member opposite the first end is positioned adjacent and parallel to the second inner flange between a vertical guide 69 and the shelf 62, but is not affixed to the second inner flange, the vertical guide, or the shelf. Accordingly the second end of the bias member is free to slide relative to second inner flange in the lengthwise direction to thereby permit various sized trays, and in particular trays having various width dimensions, to be securely retained on the shelf 62 between the outermost surface 75 of the bias member and the first outer flanges. The widthwise edges at the opposite ends of the shelf remain open and unobstructed to permit various sized trays, and in particular trays having various length dimensions, to be securely retained on the shelf.

As best shown in FIG. 3, an outwardly extending lip 72 is provided on the outermost surface 75 of the bias member 70 generally parallel to the shelf 62. The lip prevents the tray from shifting upwards and becoming loose from the shelf under the pressure exerted on the lengthwise edge of the tray by the tension member. Furthermore, the first outer flanges 68 are angled slightly in the direction of the second inner flange 67 so as to securely retain trays having various height dimensions on the shelf. It should be noted that alternative means for securely retaining any one of the various sized trays stored within the compartments of the fiber management frame 22 of the splice closure 10 during a splicing operation may be utilized without departing from the scope of the present invention. It is only necessary that the securing means is readily adjustable to receive various sized trays, and in particular, trays having various width, length, and height dimensions. It is also preferred, but not necessary, that the alternative securing means be adapted to support and securely retain other items, such as test equipment, commonly utilized to configure or reconfigure the optical connections housed by the optical fiber connection trays stored within the closure.

Figure 4:
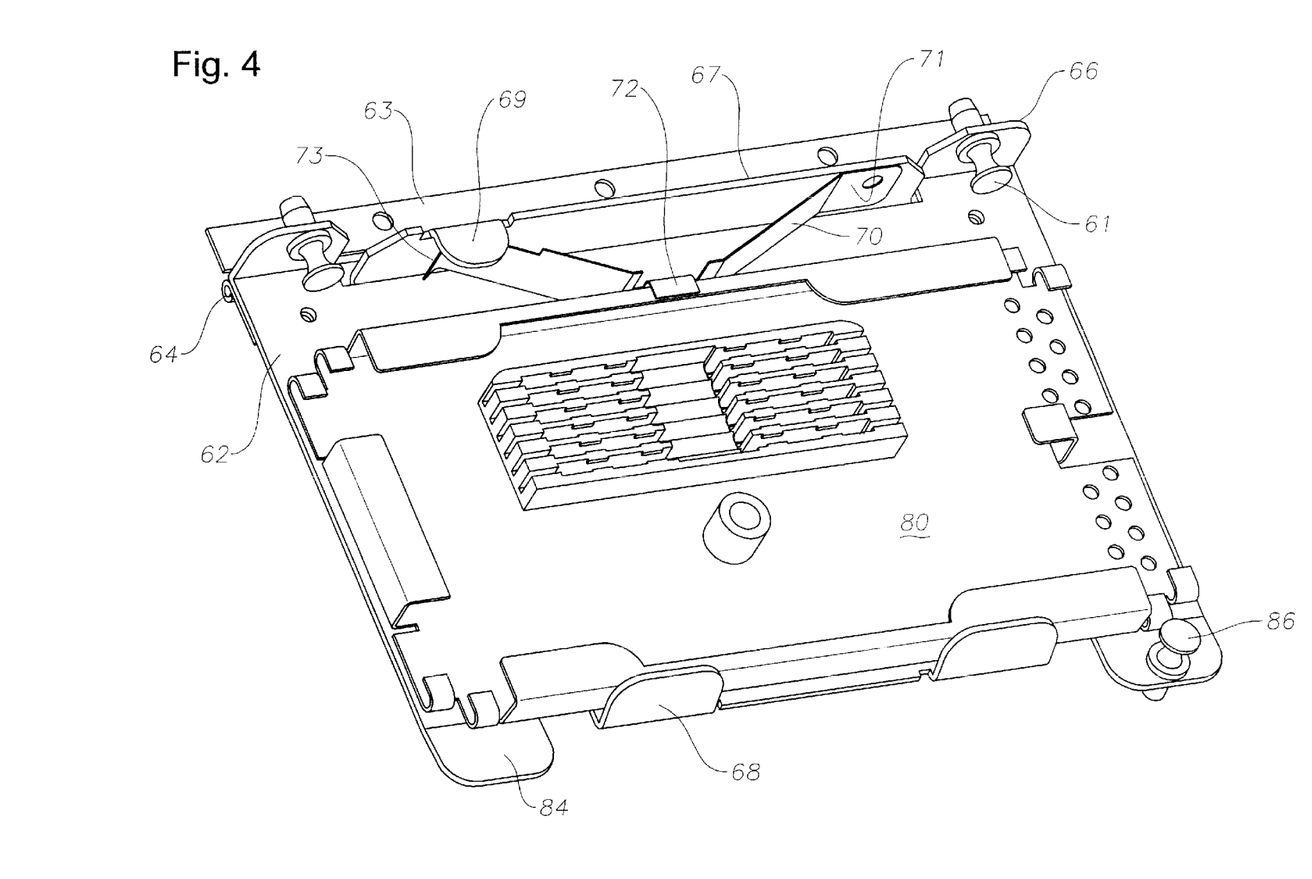
FIG. 4 is a perspective view depicting the movable work platform of FIG. 2 securely retaining an optical fiber connection tray having relatively small length and width dimensions in an operational position.

FIG. 4 illustrates a first optical fiber connection tray, and in particular a splice tray 80, securely retained on the shelf 62 of the work platform 60 between the bias member 70 and the first outer flanges 68. The work platform is shown removed from the fiber management frame 22 of the splice closure 10 for purposes of clarity. The tray 80 has relatively small length and width dimensions. As such, the bias member is disposed only slightly in the direction of the second inner flange 67, and the free end 73 of the bias member is disposed only slightly in the direction of the first inner flange 66. The distance between the outermost surface (not shown) of the bias member and the inner surfaces of the first outer flanges is selected to be slightly less than the width of the tray stored within the housing 12 of the closure having the smallest width dimension. A lengthwise edge of the tray is then positioned beneath the lip 72 provided on the outermost surface of the bias member and the bias member is disposed in the direction of the second inner flange until the opposite lengthwise edge of the tray can be lowered onto the shelf beneath the inwardly angled first outer flanges. The tray is then released so that the bias member biases the tray in the direction of the first outer flanges to thereby securely retain the tray on the shelf between the outermost surface of the bias member and the first outer flanges. Advantageously, the bias member maintains tension on the tray during a splicing operation.

Figure 5:
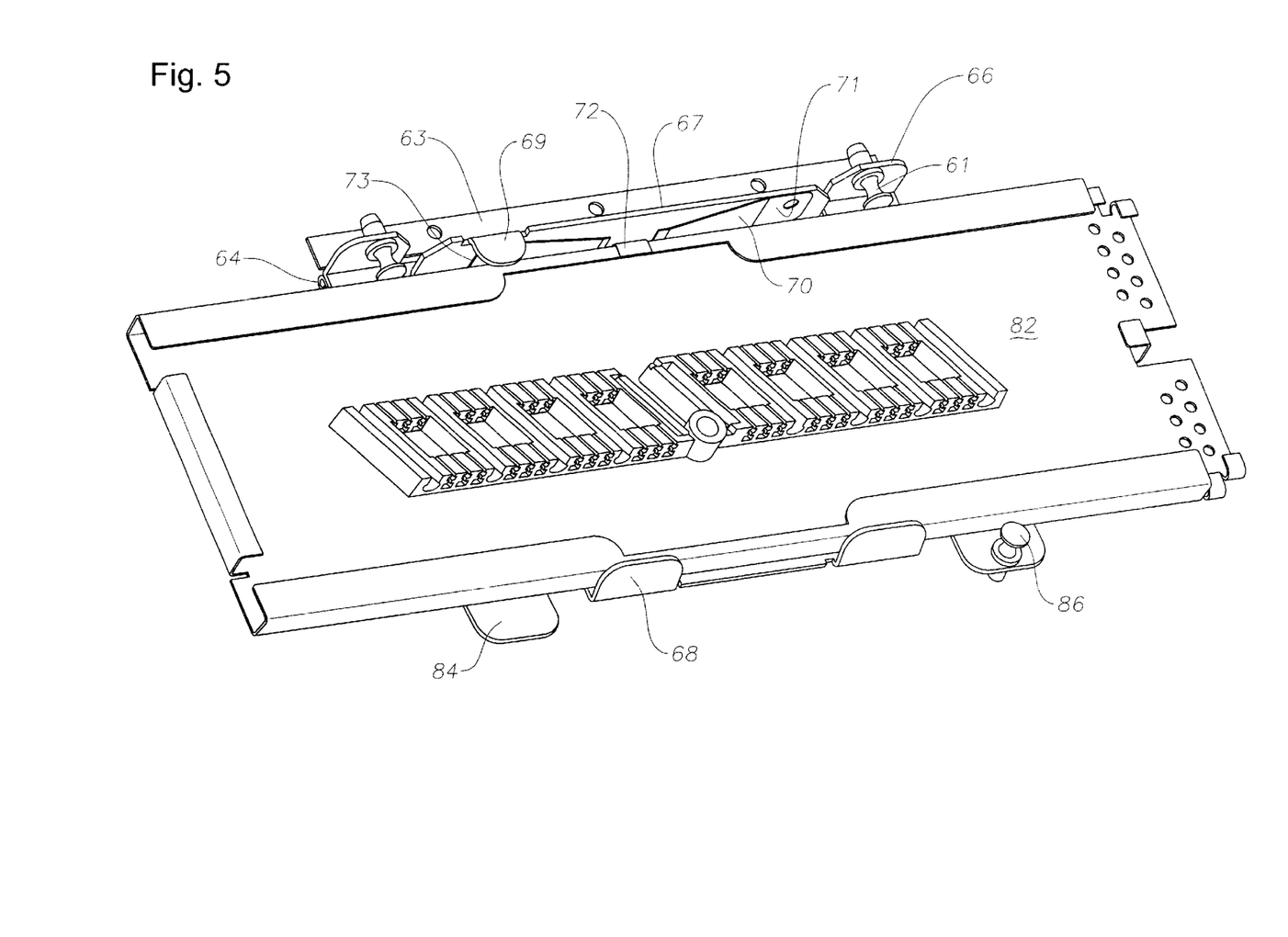
FIG. 5 is a perspective view depicting the movable work platform of FIG. 2 securely retaining an optical fiber connection tray having relatively large length and width dimensions in an operational position.

FIG. 5 illustrates a second optical fiber connection tray, and in particular a splice tray 82, securely retained on the shelf 62 of the work platform 60 between the bias member 70 and the first outer flanges 68. The work platform is shown removed from the fiber management frame 22 of the closure 10 for purposes of clarity. The tray 82 has relatively large length and width dimensions. As such, the bias member is disposed substantially in the direction of the second inner flange 67 and the free end 73 of the bias member is disposed substantially in the direction of the first inner flange 66. As previously described, a lengthwise edge of the tray is then positioned beneath the lip 72 provided on the outermost surface of the bias member and the bias member is disposed in the direction of the second inner flange until the opposite lengthwise edge of the tray can be lowered onto the shelf beneath the inwardly angled first outer flanges. The tray is then released so that the bias member biases the tray in the direction of the first outer flanges and thereby securely retains the tray on the shelf between the outermost surface of the bias member and the first outer flanges. Advantageously, the bias member maintains tension on the tray during a splicing operation.

Figure 6:
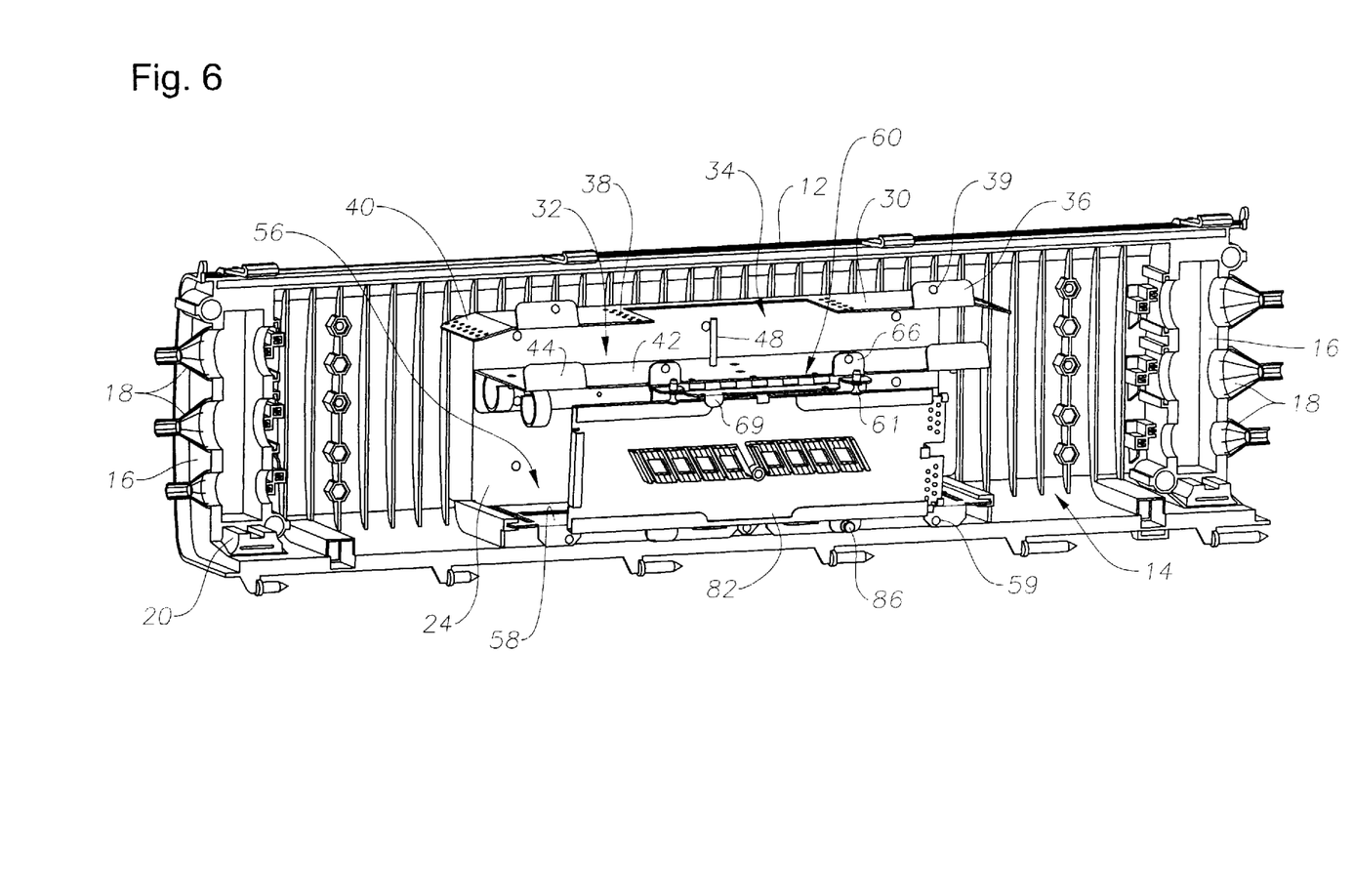
FIG. 6 is a perspective view of the interconnection closure of FIG. 1 depicting the movable work platform of FIG. 2 securely retaining a fiber optic connection tray having relatively large length and width dimensions in a stowed position.

As shown in FIGS. 2–6, the movable work platform 60 further has at least one, and preferably, at least a pair of second outer flanges 84 spaced lengthwise and extending outwardly from the outer edge of the shelf 62. At least one of the second outer flanges has an aperture therethrough for receiving a snap fastener 86 for affixing the work platform to the fiber management frame 22 or to the housing 12 of the splice closure 10 in the stowed position. In the advantageous embodiment depicted in FIG. 6, the snap fasteners 61 are opened to release the shelf of the work platform from the partition 42 of the second compartment 32 while the first half 63 of the hinge 64 remains secured to the underside of the partition 42. Accordingly, the shelf rotates about the hinge downwardly until the second outer flanges engage the partition 58 of the fourth compartment 56. Preferably, the partition 58 is provided with at least one aperture 59 for receiving the snap fastener 86 on the second outer flange and thereby affix the work platform to the partition 58 in the stowed position. The work platform thus advantageously limits the movement of the drop fiber splice trays located in the fourth compartment 56 and thereby further protects the optical connections housed by the trays from possible damage. As shown in FIG. 6, an optical fiber connection tray, such as splice tray 82, may remain securely retained on the shelf of the work platform in the stowed position.

Accordingly, the capacity of the splice closure 10 can be increased by the additional optical fiber connection tray secured on the work platform. Alternatively, unfinished optical connections between optical fibers can be temporarily stored on the additional optical fiber connection tray until reconfiguration of the closure is completed at a later time.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that further modifications and other embodiments are intended to be included within the scope of the appended claims. Although specific terms are employed herein, they are used in a generic and descriptive sense only and not for purposes of limitation.

That which is claimed is:

1. An interconnection closure comprising:
   a fiber management frame; and
   a work platform movably attached to the fiber management frame, the work platform comprising means for supporting and securely retaining various sized optical fiber connection trays;
   wherein the means for supporting and securely retaining comprises a shelf having an inner edge adjacent the fiber management frame and an outer edge opposite the inner edge, a bias member positioned on the shelf, and at least one first outer flange extending upwardly from the shelf and positioned opposite the bias member.

2. An interconnection closure according to claim 1 wherein the bias member engages a lengthwise edge of each of the trays and biases the tray in the direction of the first outer flange to securely retain the tray between the bias member and the first outer flange.

3. An interconnection closure according to claim 1 wherein the means for supporting and securely retaining further comprises at least one first inner flange extending upwardly from the shelf adjacent the inner edge of the shelf, the first inner flange having an aperture therethrough for receiving a fastener for affixing the work platform to the fiber management frame.

4. An interconnection closure according to claim 3 wherein the means for supporting and securely retaining further comprises at least one second inner flange extending upwardly from the shelf and wherein the bias member is affixed to the second inner flange.

5. An interconnection closure according to claim 1 wherein the work platform is hingedly mounted to the fiber management frame and wherein the means for supporting and securely retaining further comprises a hinge having a first half affixed to the fiber management frame and a second half affixed to the work platform.

6. An interconnection closure according to claim 1 wherein the means for supporting and securely retaining further comprises at least one first inner flange extending upwardly from the shelf adjacent the inner edge of the shelf, the first inner flange having an aperture therethrough for receiving a fastener for affixing the work platform to the fiber management frame in an operational position, and a second outer flange extending outwardly from the shelf, the second outer flange having an aperture therethrough for receiving a fastener for affixing the work platform to the fiber management frame in a stowed position.

7. An interconnection closure according to claim 1 wherein the optical fiber connection tray is selected from the group consisting of a splice tray, a coupler tray, and a connector panel.

8. A fiber management frame having a movable work platform adjacent the fiber management frame for supporting and securely retaining various sized optical fiber connection trays, the work platform comprising:
   a shelf having an inner edge adjacent the fiber management frame and an outer edge opposite the inner edge;
   a bias member positioned on the shelf; and
   a first outer flange extending upwardly from the shelf and opposite the bias member;
   wherein the bias member engages a lengthwise edge of the trays and bias the tray in the direction of the first outer flange.

9. A fiber management frame according to claim 8 wherein the work platform further comprises at least one first inner flange extending upwardly from the shelf adjacent the inner edge of the shelf, the first inner flange having an aperture therethrough for receiving a fastener for affixing the work platform to the fiber management frame.

10. A fiber management frame according to claim 9 wherein the work platform further comprises at least one second inner flange extending upwardly from the shelf and wherein the bias member is affixed to the second inner flange.

11. A fiber management frame according to claim 9 wherein the work platform is hingedly mounted to the fiber management frame and further comprises a hinge having a first half affixed to the fiber management frame and a second half affixed to the work platform.

12. A fiber management frame according to claim 11 wherein the first inner flange has an aperture therethrough for receiving a fastener for affixing the work platform to the fiber management frame in an operational position and wherein the work platform further comprises a second outer flange extending outwardly from the shelf, the second outer flange having an aperture therethrough for receiving a fastener for affixing the work platform to the fiber management frame in a stowed position.

13. A fiber management frame according to claim 8 wherein the optical fiber connection tray is selected from the group consisting of a splice tray, a coupler tray, and a connector panel.

14. A fiber management frame according to claim 10 wherein the bias member is a thin, elongate strip of elastic material having a first end affixed to the second inner flange, a second end opposite the first end and positioned adjacent and parallel to the second inner flange, and an outermost portion opposite the first outer flange, the outermost portion exerting pressure on the lengthwise edge of the trays to securely retain the tray between the outermost portion of the bias member and the first outer flange.

15. A work platform movably attached to a fiber management frame housed within an interconnection closure, the work platform comprising:
   a shelf for supporting various sized optical fiber connection trays housed within the closure, the shelf having an inner edge adjacent the fiber management frame and an outer edge opposite the inner edge;
   a bias member positioned on the shelf; and
   a first outer flange extending upwardly from the shelf and positioned opposite the bias member.

16. A work platform according to claim 15 wherein the bias member engages a lengthwise edge of the trays and biases the tray in the direction of the first outer flange to thereby securely retain the tray between the bias member and the first outer flange.

17. A work platform according to claim 15 further comprising:
 a first inner flange extending upwardly from the shelf adjacent the inner edge of the shelf, the first inner flange having an aperture therethrough for receiving a fastener for affixing the work platform to the fiber management frame in an operational position; and
 a second outer flange extending outwardly from the shelf, the second outer flange having an aperture therethrough for receiving a fastener for affixing the work platform to the fiber management frame in a stowed position.

18. A work platform according to claim 15 further comprising a hinge having a first half affixed to the fiber management frame and a second half affixed to the shelf such that the shelf rotates about the hinge between an operational position and a stowed position.

19. A work platform according to claim 17 further comprising a second inner flange extending upwardly from the shelf and wherein the bias member is a thin, elongate strip of elastic material having a first end affixed to the second inner flange, a second end opposite the first end and positioned adjacent and parallel to the second inner flange, and an outermost portion opposite the first outer flange, the outermost portion exerting pressure on the lengthwise edge of the trays to securely retain the tray between the outermost portion of the bias member and the first outer flange.

20. A fiber management frame having a movable work platform hingedly mounted to the fiber management frame for supporting and securely retaining various sized optical fiber connection trays, the work platform comprising:
 a shelf for receiving one of the trays thereon, the shelf having an inner edge adjacent the fiber management frame and an outer edge opposite the inner edge;
 a hinge having a first half affixed to the fiber management frame and a second half affixed to the shelf adjacent the inner edge;
 a first inner flange extending upwardly from the shelf adjacent the inner edge of the shelf, the first inner flange having an aperture therethrough for receiving a fastener for affixing the work platform to the fiber management frame in an operational position;
 a second inner flange extending upwardly from the shelf;
 a first outer flange extending upwardly from the shelf;
 a second outer flange extending outwardly from the shelf the second outer flange having an aperture therethrough for receiving a fastener for affixing the work platform to the fiber management frame in a stowed position; and
 a bias member affixed to the second inner flange and positioned opposite the first outer flange, the bias member engaging a lengthwise edge of the trays and biasing the tray in the direction of the first outer flange such that the tray is securely retained between the bias member and the first outer flange.

21. A method of supporting and securely retaining various sized optical fiber connection trays on a movable work platform adjacent a fiber management frame housed within an interconnection closure, the work platform comprising a shelf, a bias member positioned on the shelf, and a first outer flange extending upwardly from the shelf and positioned opposite the bias member, the method comprising the steps of:
 positioning the work platform in an operational position adjacent the fiber management frame;
 removing one of the trays from the fiber management frame;
 positioning the tray on the work platform between the bias member and the first outer flange such that the bias member biases the tray in the direction of the first outer flange.

22. The method of claim 21 wherein the work platform further comprises:
 a first inner flange extending upwardly from the shelf adjacent the inner edge of the shelf, the first inner flange having an aperture therethrough for receiving a fastener for affixing the work platform to the fiber management frame in an operational position; and
 a second outer flange extending outwardly from the shelf, the second outer flange having an aperture therethrough for receiving a fastener for affixing the work platform to the fiber management frame in a stowed position.

23. The method of claim 22 wherein the work platform is hingedly mounted to the fiber management frame and the work platform further comprises a hinge having a first half affixed to the fiber management frame and a second half affixed to the shelf such that the shelf rotates about the hinge between the operational position and the stowed position.

24. An interconnection closure comprising:
 a fiber management frame;
 an optical fiber connection tray removably attached to the fiber management frame, the tray housing at least one optical connection; and
 a work platform attached to the fiber management frame and movable between a stowed position and an operational position, the work platform comprising means for supporting and securely retaining the tray in the operational position when the tray is removed from the fiber management frame to reconfigure the optical connection.

25. An interconnection closure according to claim 24 wherein the means for supporting and securely retaining comprises a shelf having an inner edge adjacent the fiber management frame and an outer edge opposite the inner edge, a bias member positioned on the shelf, and at least one first outer flange extending upwardly from the shelf and positioned opposite the bias member.

26. An interconnection closure according to claim 24 wherein the work platform is hingedly mounted to the fiber management frame and wherein the means for supporting and securely retaining comprises a hinge having a first half affixed to the fiber management frame and a second half affixed to the work platform.

27. An interconnection closure according to claim 26 wherein the means for supporting and securely retaining further comprises at least one first inner flange extending upwardly from the shelf adjacent the inner edge of the shelf, the first inner flange having an aperture therethrough for receiving a fastener for affixing the work platform to the fiber management frame in the operational position, and a second outer flange extending outwardly from the shelf, the second outer flange having an aperture therethrough for receiving a fastener for affixing the work platform to the fiber management frame in the stowed position.

28. An interconnection closure according to claim 24 wherein the optical fiber connection tray is selected from the group consisting of a splice tray, a coupler tray, and a connector panel.

* * * * *